(12) United States Patent
Wu

(10) Patent No.: US 11,497,055 B2
(45) Date of Patent: Nov. 8, 2022

(54) CONTROL CHANNEL TRANSMISSION METHOD AND DEVICE, AND STORAGE MEDIUM

(71) Applicant: GUANGDONG OPPO MOBILE TELECOMMUNICATIONS CORP., LTD., Guangdong (CN)

(72) Inventor: Zuomin Wu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/464,492

(22) Filed: Sep. 1, 2021

(65) Prior Publication Data

US 2021/0400718 A1    Dec. 23, 2021

Related U.S. Application Data

(63) Continuation of application No. 17/392,966, filed on Aug. 3, 2021, now abandoned, which is a
(Continued)

(51) Int. Cl.
*H04W 72/00* (2009.01)
*H04W 16/02* (2009.01)
(Continued)

(52) U.S. Cl.
CPC ..... *H04W 74/0808* (2013.01); *H04W 72/042* (2013.01); *H04W 72/0446* (2013.01); *H04W 72/0453* (2013.01); *H04W 16/14* (2013.01)

(58) Field of Classification Search
CPC ........... H04W 74/0808; H04W 72/042; H04W 72/0446; H04W 72/0453; H04W 16/14
See application file for complete search history.

(56) References Cited

U.S. PATENT DOCUMENTS

2018/0192383 A1  7/2018  Nam et al.
2018/0332505 A1  11/2018  Kim et al.
(Continued)

FOREIGN PATENT DOCUMENTS

CN    106375075 A    2/2017
CN    106376083 A    2/2017
(Continued)

OTHER PUBLICATIONS

International Search Report (ISR) dated Oct. 29, 2019 for Application No. PCT/CN2019/075299.
(Continued)

*Primary Examiner* — Melvin C Marcelo
(74) *Attorney, Agent, or Firm* — Ladas & Parry, LLP

(57) ABSTRACT

Embodiments of the present application provide a control channel transmission method and device and a storage medium. The method applied to a network device side includes: the network device maps a first control channel to S first transmission units included in a first control resource set, the first control resource set is a control resource set on a first BWP, the first BWP includes N subbands, the first control resource set is located on at least one subband of the N subbands, the first transmission unit is a smallest unit for transmitting a control channel, S and N are positive integers, S≥1 and N≥2; further, the network device transmits the first control channel to a terminal device.

8 Claims, 6 Drawing Sheets

Related U.S. Application Data continuation of application No. PCT/CN2019/075299, filed on Feb. 15, 2019.

(51) Int. Cl.
  *H04W 74/08* (2009.01)
  *H04W 72/04* (2009.01)
  *H04W 16/14* (2009.01)

(56) References Cited

U.S. PATENT DOCUMENTS

| | | | | |
|---|---|---|---|---|
| 2020/0229270 | A1* | 7/2020 | Chatterjee | H04W 80/08 |
| 2021/0352633 | A1* | 11/2021 | Tiirola | H04W 16/14 |

FOREIGN PATENT DOCUMENTS

| CN | 107636997 A | 1/2018 |
|---|---|---|
| CN | 109152013 A | 1/2019 |
| CN | 109309550 A | 2/2019 |
| RU | 2595642 C1 | 8/2016 |
| WO | 2018121621 A1 | 7/2018 |
| WO | 2018203657 A1 | 11/2018 |
| WO | 2018204884 A1 | 11/2018 |
| WO | 2018231036 A1 | 12/2018 |
| WO | 2019029528 A1 | 2/2019 |
| WO | 2019089125 A1 | 5/2019 |

OTHER PUBLICATIONS

Written Opinion of the International Searching Authority (WOSA) dated Oct. 23, 2019 for Application No. PCT/CN2019/075299.
The EESR of corresponding European application No. 19915146.5, dated Nov. 23, 2021.
Office Action for Indian Application No. 202117036094, dated Mar. 17, 2022.
The first Office Action of corresponding Russian application No. 2021124128, dated May 23, 2022.
The first action of corresponding EP application No. 19915146.5 dated Jul. 19, 2022.

* cited by examiner

CONTROL CHANNEL TRANSMISSION METHOD AND DEVICE, AND STORAGE MEDIUM

CROSS-REFERENCE TO RELATED APPLICATION

This application is a continuation of U.S. application Ser. No. 17/392,966, filed on Aug. 3, 2021, which is a continuation of International Application No. PCT/CN2019/075299, filed on Feb. 15, 2019, the disclosures of which are hereby incorporated by reference in their entireties.

TECHNICAL FIELD

The embodiments of the present application relate to communication technologies, and in particular, to a control channel transmission method and device, and a storage medium.

BACKGROUND

An unlicensed spectrum is a spectrum that can be used for radio equipment communications allocated by countries and regions. This spectrum is usually considered to be a shared spectrum, that is, communication devices in different communication systems can use the spectrum as long as they meet regulatory requirements set by the countries or regions on the spectrum, and there is no need to apply to a government for an exclusive spectrum license. In addition, the communication devices communicating on the unlicensed spectrum needs to follow a principle of listen before talk (LBT), that is, before a communication device transmits a signal on a channel of the unlicensed spectrum, it needs to listen to the channel, and can transmit the signal on the channel only when a listening result is that the channel is idle.

In a new radio-based access to unlicensed spectrum (NR-U) system, the spectrum used by a communication device is the unlicensed spectrum. In addition, the system bandwidth of the NR-U system is relatively large, for example, the system bandwidth is 40 MHz, 60 MHz, 80 MHz and so on. Correspondingly, the bandwidth of the bandwidth part (BWP) configured by the system for a terminal may also be 40 MHz, 60 MHz, 80 MHz, etc. Since the bandwidth of an LBT subband on the unlicensed spectrum is 20 MHz, one BWP may include multiple LBT subbands.

Therefore, when a BWP includes multiple LBT subbands, how to transmit a control channel on the multiple LBT subbands included in the BWP is currently an urgent problem to be solved.

SUMMARY

The embodiments of the present application provide a control channel transmission method and device and a storage medium to solve the problem of how to transmit a first control channel on multiple subbands.

In a first aspect, an embodiment of the present application can provide a control channel transmission method applied to a network device, and the method includes:

mapping a first control channel to S first transmission units included in a first control resource set, where the first control resource set is a control resource set on a first bandwidth part BWP, the first BWP includes N subbands, the first control resource set is located on at least one subband of the N subbands, the first transmission unit is a smallest unit for transmitting a control channel, S and N are positive integers, S≥1 and N≥2;

transmitting the first control channel to a terminal device.

In a second aspect, an embodiment of the present application can provide a control channel transmission method applied to a terminal device, and the method includes:

receiving a first control channel transmitted by a network device, the first control channel being mapped to S first transmission units included in a first control resource set, where the first control resource set is a control resource set on a first bandwidth part BWP, the first BWP includes N subbands, the first control resource set is located on at least one subband of the N subbands, the first transmission unit is a smallest unit for transmitting a control channel, S and N are positive integers, S≥1 and N≥2.

In a third aspect, an embodiment of the present application can provide a control channel transmission method applied to a terminal device, and the method includes:

receiving a control channel according to a first control resource set, where the first control resource set is a control resource set on a first bandwidth part BWP, the first BWP includes N subbands, the first control resource set is located on K subbands of the N subbands, N and K are positive integers, and N≥K≥2;

receiving a control channel according to a second control resource set, when determining that a subband for communication in the first BWP does not include at least one subband of the K subbands, wherein the second control resource set is located on P subbands of the K subbands, P is a positive integer and 1≤P<K.

In a fourth aspect, an embodiment of the present application can provide a network device, including:

a processing module, configured to map a first control channel to S first transmission units included in a first control resource set, where the first control resource set is a control resource set on a first bandwidth part BWP, the first BWP includes N subbands, the first control resource set is located on at least one subband of the N subbands, the first transmission unit is a smallest unit for transmitting a control channel, S and N are positive integers, S≥1 and N≥2;

a transmitting module, configured to transmit the first control channel to a terminal device.

In a fifth aspect, an embodiment of the present application can provide a terminal device, including:

a receiving module, configured to receive a first control channel transmitted by a network device, the first control channel being mapped to S first transmission units included in a first control resource set, where the first control resource set is a control resource set on a first bandwidth part BWP, the first BWP includes N subbands, the first control resource set is located on at least one subband of the N subbands, the first transmission unit is a smallest unit for transmitting a control channel, S and N are positive integers, S≥1 and N≥2.

In a sixth aspect, an embodiment of the application can provide a terminal device, including:

a receiving module, configured to receive a control channel according to a first control resource set, where the first control resource set is a control resource set on a first bandwidth part BWP, the first BWP includes N subbands, the first control resource set is located on K subbands of the N subbands, N and K are positive integers and N≥K≥2;

a processing module, configured to determine that a subband for communication in the first BWP does not include at least one subband of the K subbands;

the receiving module being further configured to: when the processing module determines that the subband for communication in the first BWP does not include at least one subband of the K subbands, receive the control channel according to a second control resource set, where the second control resource set is located on P subbands of the K subbands, P is a positive integer and 1≤P<K.

In a seventh aspect, an embodiment of the present application can provide a network device, including:

a processor, a memory and an interface for communication with a terminal device;

the memory storing computer execution instructions;

the processor executing the computer execution instructions stored in the memory to cause the processor to execute the control channel transmission method as described in the first aspect.

In an eighth aspect, an embodiment of the present application can provide a terminal device, including:

a processor, a memory and an interface for communication with a network device;

the memory storing computer execution instructions;

the processor executing the computer execution instructions stored in the memory to cause the processor to execute the control channel transmission method as described in the second aspect or the third aspect.

In a ninth aspect, an embodiment of the present application provides a computer-readable storage medium, the computer-readable storage medium stores computer execution instructions, and the computer execution instructions, when executed by a processor, are configured to implement the control channel transmission method as described in the first aspect.

In a tenth aspect, an embodiment of the present application provides a computer-readable storage medium, the computer-readable storage medium stores computer execution instructions, and the computer execution instructions, when executed by the processor, are configured to implement the control channel transmission method as described in the second aspect or the third aspect.

In an eleventh aspect, an embodiment of the present application provides a program, which, when executed by a processor, is configured to execute the control channel transmission method described in the first aspect above.

In a twelfth aspect, an embodiment of the present application also provide a program, which, when executed by a processor, is configured to execute the control channel transmission method described in the second or third aspect above.

Optionally, the foregoing processor may be a chip.

In a thirteenth aspect, an embodiment of the present application provides a computer program product including program instructions, and the program instructions are configured to implement the control channel transmission method described in the first aspect.

In a fourteenth aspect, an embodiment of the present application provides a computer program product including program instructions, and the program instructions are configured to implement the control channel transmission method described in the second aspect or the third aspect.

In a fifteenth aspect, an embodiment of the present application provides a chip, including: a processing module and a communication interface, the processing module can execute the control channel transmission method described in the first aspect.

Further, the chip also includes a storage module (such as a memory), the storage module is configured to store instructions, the processing module is configured to execute the instructions stored in the storage module, and the execution of the instructions stored in the storage module causes the processing module to execute the control channel transmission method described in the first aspect.

In a sixteenth aspect, an embodiment of the present application provides a chip, including: a processing module and a communication interface, and the processing module can execute the control channel transmission method described in the second or third aspect.

Further, the chip also includes a storage module (such as a memory), the storage module is configured to store instructions, the processing module is configured to execute the instructions stored in the storage module, and the execution of the instructions stored in the storage module causes the processing module to execute the control channel transmission method described in the second or third aspect.

In the control channel transmission method and device and the storage medium according to the embodiments of the application, the network device maps the first control channel to at least one first transmission unit in the control resource set on the first bandwidth part BWP, the first transmission unit is the smallest unit for transmitting a control channel, the first bandwidth part BWP includes multiple subbands, at least one of the multiple subbands is configured with a control resource, and the control resource configured on at least one of the plurality of subbands forms a control resource set on the BWP, so that the network device can map the first control channel to the first transmission unit in the control resource on the at least one subband, and then, transmit the first control channel to the terminal device through the first transmission unit in the control resource on at least one subband, thereby solving the problem of how to transmit the first control channel on multiple subbands.

BRIEF DESCRIPTION OF DRAWINGS

In order to more clearly describe the technical solutions in the embodiments of the present application or the prior art, the following will briefly introduce the drawings that need to be used in the description of the embodiments or the prior art. Obviously, the drawings in the following description are some embodiments of the present application. For those of ordinary skill in the art, other drawings can be obtained based on these drawings without creative work.

DESCRIPTION OF EMBODIMENTS

Figure 1:
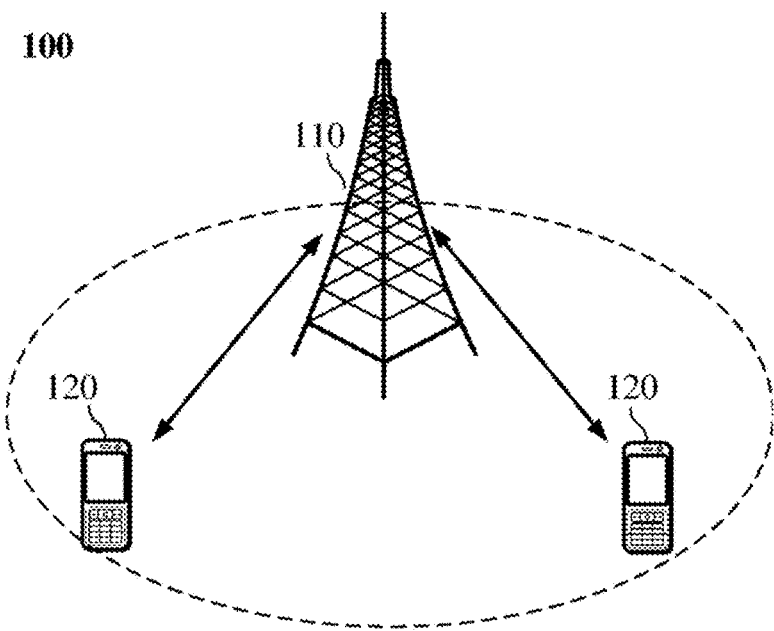
FIG. 1 is a schematic diagram of a communication system according to the present application.

In order to make the purpose, technical solutions and advantages of the embodiments of the present application clearer, the technical solutions in the embodiments of the present application will be described clearly and completely in conjunction with the accompanying drawings in the embodiments of the present application. Obviously, the described embodiments are part of the embodiments of the present application, rather than all of the embodiments. Based on the embodiments in the present application, all other embodiments obtained by those of ordinary skill in the art without creative work shall fall within the protection scope of the present application.

The terms "first", "second", etc. in the description, claims and the above-mentioned drawings of the embodiments of the present application are used to distinguish similar objects, and are not necessarily used to describe a specific sequence or sequential order. It should be understood that the data used in this way can be interchanged under appropriate circumstances, so that the embodiments of the present application described here, for example, can be implemented in a sequence other than those illustrated or described here. In addition, the terms "including" and "having" and any variations thereof are intended to cover non-exclusive inclusions. For example, a process, a method, a system, a product or a device that includes a series of steps or units is not necessarily limited to what is clearly listed. Instead, it may include other steps or units that are not clearly listed or are inherent to the process, method, product or device.

The technical solutions in the embodiments of the present application will be described below in conjunction with the drawings in the embodiments of the present application. Obviously, the described embodiments are part of the embodiments of the present application, rather than all of the embodiments. Based on the embodiments in the present application, all other embodiments obtained by those of ordinary skill in the art without creative work shall fall within the protection scope of the present application.

The technical solutions of the embodiments of the present application can be applied to various communication systems, such as: a global system of mobile communication (GSM) system, a code division multiple access (CDMA) system, a wideband code division multiple access (WCDMA) system, general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks (WLAN), Wireless Fidelity (WiFi), a next-generation communication system or other communication systems, etc.

Generally speaking, traditional communication systems support a limited number of connections and are easy to implement. However, with the development of communication technology, mobile communication systems will not only support traditional communications, but also support, for example, device to device (D2D) communication, machine to machine (M2M) communication, machine type communication (MTC), and vehicle to vehicle (V2V) communication, etc. The embodiments of the present application can also be applied to these communications system.

Illustratively, a communication system 100 applied in an embodiment of the present application is as shown in FIG. 1. The communication system 100 may include a network device 110, and the network device 110 may be a device that communicates with a terminal device 120 (or called a communication terminal or a terminal). The network device 110 may provide communication coverage for a specific geographic area, and may communicate with terminal devices located in the coverage area. Optionally, the network device 110 may be a base station (BTS) in a GSM system or a CDMA system, or a base station (NB) in a WCDMA system, or an evolutional base station in an LTE system (Evolutional Node B, eNB or eNodeB), or a radio controller in a cloud radio access network (CRAN), or the network device may be a mobile switching center, a relay station, an access point, a vehicle-mounted device, a wearable device, a hub, a switch, a bridge, a router, a network side device in a 5G network, or a network device in a future evolved public land mobile network (PLMN).

The communication system 100 also includes at least one terminal device 120 located within the coverage area of the network device 110. As used herein, "terminal device" includes, but is not limited to, being connected via wired lines, for example, being connected via public switched telephone networks (PSTN), digital subscriber line (DSL), digital cable, direct cable; and/or another data connection/network; and/or via a wireless interface, such as for cellular networks, wireless local area networks (WLAN), digital television networks such as DVB-H networks, satellite networks, AM-FM broadcast transmitters; and/or another terminal device that is set to receive/transmit communication signals; and/or Internet of things (IoT) equipment. A terminal device set to communicate through a wireless interface may be referred to as a "wireless communication terminal", a "wireless terminal" or a "mobile terminal". Examples of mobile terminals include, but are not limited to, satellite or cellular phones; personal communications system (PCS) terminals that may combine cellular radio phones with data processing, fax, and data communication capabilities; PDAs that may include radio telephones, pagers, Internet/Intranet access, Web browsers, note pads, calendars, and/or global positioning system (GPS) receivers; and conventional laptops and/or handheld receivers or other electronic devices including radio telephone transceivers. The terminal device may refer to an access terminal, a user equipment (UE), a user unit, a user station, a mobile console, a mobile station, a remote station, a remote terminal, a mobile device, a user terminal, a terminal, a wireless communication equipment, a user agent, or a user device. The access terminal may be a cellular phone, a cordless phone, a session initiation protocol (SIP) phone, a wireless local loop (WLL) station, a personal digital assistant (PDA), a handheld device with wireless communication functions, a computing device or other processing devices connected to a wireless modem, an in-vehicle device, a wearable device, a terminal device in the 5G network, or a terminal device in the future evolved PLMN, etc.

Optionally, device to device (D2D) communication may be performed between the terminal devices 120.

Optionally, the 5G system or 5G network may also be referred to as a new radio (NR) system or NR network.

FIG. 1 illustratively shows one network device and two terminal devices. Optionally, the communication system 100 may include multiple network devices, and the coverage of each network device may include another number of terminal devices, which is not limited in the embodiment of the present application.

In FIG. 1, the network device may be an access device, for example, it may be an access device in an NR-U system, such as 5G's new radio access technology (NR) base station (next generation Node B, gNB) or a small station, a micro station, and may also be a relay station, a transmission and reception point (TRP), a road side unit (RSU), etc.

The terminal device may also be called a mobile terminal, a user equipment (UE for short), an access terminal, a user unit, a user station, a mobile station, a mobile console, a user terminal, a terminal, a wireless communication device, a user agent, or a user device. Specifically, it may be a smart phone, a cellular phone, a cordless phone, a personal digital assistant (PDA) device, a handheld device with wireless communication functions, or other processing devices connected to a wireless modem, an in-vehicle device, a wearable device, etc. In the embodiments of the present application, the terminal device has an interface for communicating with the network device (for example, a cellular network).

Optionally, the communication system 100 may also include other network entities such as a network controller and a mobility management entity, which are not limited in the embodiment of the present application.

It should be understood that a device with a communication function in the network/system in the embodiment of the present application may be referred to as a communication device. Taking the communication system 100 shown in FIG. 1 as an example, the communication device may include a network device 110 and a terminal device 120 which have communication functions, and the network device 110 and the terminal device 120 may be the specific devices described above, which will not be repeated here. The communication device may also include other devices in the communication system 100, for example, a network controller, a mobility management entity and other network entities, which are not limited in the embodiment of the present application.

It should be understood that the terms "system" and "network" are often used interchangeably herein. The term "and/or" herein is only an association relationship describing the associated objects, which means that there can be three kinds of relationships, for example, A and/or B can mean: there are three cases of A exists alone, both A and B exist, and B exists alone. In addition, the character "/" used herein generally indicates that the associated objects before and after are in an "or" relationship.

The method in the embodiments of the present application may be applied to communication in an unlicensed spectrum, and may also be applied to other communication scenarios, such as a scenario of communication in a licensed spectrum.

An unlicensed spectrum is a spectrum allocated by countries and regions which is available for radio device communications. The spectrum can be considered as a shared spectrum, that is, communication devices in different communication systems can use the spectrum as long as they meet regulatory requirements set by the countries or regions on the spectrum, without applying to a government for a exclusive spectrum license. In order to enable various communication systems that use the unlicensed spectrum for wireless communication to coexist friendly on this spectrum, communication devices may follow a principle of listen before talk (LBT) when communicating on the unlicensed spectrum, that is, communication devices need to perform channel listening (or called channel detection) first before transmitting a signal on a channel of the unlicensed spectrum. Only when a channel detection result is that the channel is idle, the communication device may perform signal transmission, or in other words, the communication device has obtained a channel use right. If a channel sensing result of the communication device on the unlicensed spectrum is that the channel is busy, the communication device cannot transmit the signal, or in other words, the communication device does not obtain the channel use right. Optionally, bandwidth of the LBT is 20 MHz, or an integer multiple of 20 MHz.

The control channel transmission method provided in the present application includes: a network device maps a first control channel to S first transmission units included in a first control resource set, where the first control resource set is a control resource set on a first bandwidth part BWP, the first BWP includes N subbands, the first control resource set is located on at least one subband of the N subbands, the first transmission unit is a smallest unit for transmitting a control channel, S and N are positive integers, S≥1, N≥2; further, the network device transmits the first control channel to a terminal device.

It should be understood that the subband may be an LBT subband, or a subband divided in other ways, which is not limited in the present application.

Figure 2:
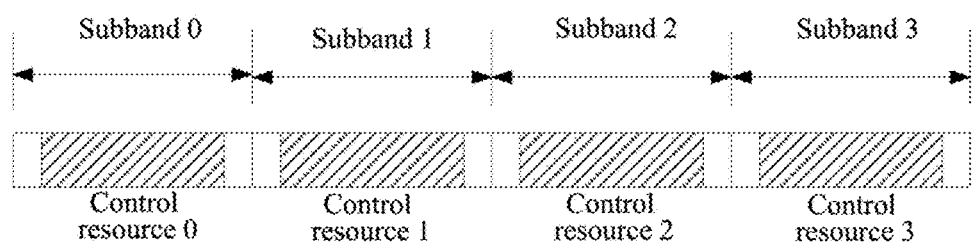
FIG. 2 is a schematic diagram of a control resource according to the present application.

In this embodiment, the first control channel may specifically be a physical downlink control channel (PDCCH) transmitted by the network device to the terminal device. The first bandwidth part BWP may be a BWP configured by the system for the terminal device. The BWP includes multiple subbands, and the number of subbands included in the BWP is denoted as N, N is a positive integer, and N≥2. Taking N=4 as an example, as shown in FIG. 2, the BWP configured by the system for the terminal device includes 4 subbands, for example subband 0, subband 1, subband 2, and subband 3. Optionally, each of subband 0, subband 1, subband 2, and subband 3 is an LBT subband. At least one of the four subbands may be configured with a control resource, and the number of control resources configured on each subband is not limited. Here, a set of control resources included in the BWP may be denoted as the first control resource set, and the first control resource set may be located on at least one of the four subbands.

Figure 3:
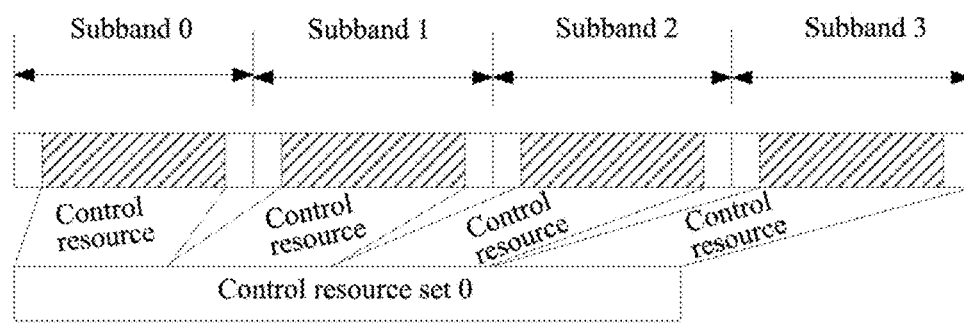
FIG. 3 is a schematic diagram of another control resource according to the present application.

As shown in FIG. 2, each subband is configured with a control resource, and the control resource sets 0-3 are denoted as the first control resource set. Or, the first control resource set may specifically be a control resource set (CORESET). As shown in FIG. 3, the network device configures the terminal device with a control resource set 0, and the control resource set 0 has a control resource on each subband. Or, the control resource set 0 may also have corresponding control resources in some of the 4 subbands. For example, the control resource set 0 may have a control resource on subband 0 and have no control resources on other subbands. For another example, the control resource set 0 may have control resources on subband 0 and subband 1, and have no control resources on other subbands. As shown in FIG. 2 or FIG. 3, optionally, the control resource on each subband may include an integer number of first transmission units, and the first transmission unit may specifically be a control channel element (CCE), and the CCE is the smallest unit for transmitting a PDCCH. Here, the control resource on each sub-band can be denoted as a control resource subset, that is, the first control resource set is formed by control resource subsets, and since there may not be a control resource subset on every subband, the number of control resource subsets included in the first control resource set is less than or equal to the number of subbands included in the BWP. Here, the number of control resource subsets included in the first control resource set may be denoted as K, K is a positive integer, and Each control resource subset of the K control resource subsets may include an integer number of CCEs. Here, the number of CCEs included in each control resource subset is denoted as R.

When K is less than N, it means that there are no control resource subsets on some of the N subbands. For example, K=3, N=4, indicating that only 3 of the 4 subbands have control resource subsets, and one subband does not have a control resource subset. For example, subband 0, subband 1, and subband 2 respectively have a control resource subset, and subband 3 does not have a control resource subset. When K is equal to N, it means that each of the N subbands has a control resource subset.

Optionally, the size of the control resource subset on each subband is the same. Taking K=4, N=4, R=2 as an example, each of the 4 subbands has a control resource subset, and the control resource subset on each subband includes 2 CCEs, then the control resource subsets on the 4 subbands include a total of 8 CCEs, that is, the first control resource set includes 8 CCEs. The network device may map the PDCCH to the 8 CCEs, or the network device may map the PDCCH to some of the 8 CCEs.

Optionally, the size of the control resource subset on each subband is different. Taking K=4 and N=4 as an example, each of the 4 subbands has a control resource subset, where the control resource subsets on subband 0 and subband 1 include 6 CCEs, respectively, and the control resource subsets on subband 2 and subband 3 include 4 CCEs, respectively. In some embodiments, the size of the control resource subset on each subband may be different. The control channel transmission method provided in the present application is not only applicable to scenarios where the size of the control resource subset on each subband is the same, but also applicable to scenarios where the size of the control resource subset on each subband is different. In the following embodiments, the control resource subsets on each subband having the same size is taken as an example for illustrative description. Optionally, when the size of the control resource subset on each subband is different, in the process of the CCE or REG group mapping method provided in the embodiments, when the control resource subset on a subband does not include unmapped CCE or REG group, the mapping of the subband can be skipped.

In the control channel transmission method provided in this embodiment, the network device maps the first control channel to at least one first transmission unit in the control resource set on the first bandwidth part BWP, the first transmission unit is the smallest unit for transmitting a control channel, the first bandwidth part BWP includes multiple subbands, at least one subband of the multiple subbands is configured with a control resource, and the control resource configured on the at least one of the multiple subbands forms a control resource set on the BWP, so that the network device can map the first control channel to the first transmission unit in the control resource on the at least one subband, and thus, transmit the first control channel to the terminal device through the first transmission unit in the control resource on the at least one subband, thereby solving the problem of how to transmit the first control channel on multiple subbands.

Generally, a CCE includes 6 resource element groups (REGs), and a REG occupies 12 subcarriers in the frequency domain and 1 symbol in the time domain. One REG may include 12 resource elements (REs). It can be understood that REs in one REG may be used to transmit a PDCCH or a demodulation reference signal (DMRS).

Take R=2 as an example, that is, each control resource subset includes 2 CCEs, and each control resource subset includes 12 REGs, then in a same control resource subset, there will be a corresponding mapping relationship between CCEs and REGs. Before introducing the mapping relationship between CCEs and REGs, a concept of resource unit group is introduced first. The resource unit group may be an REG group. One REG group includes L consecutive REGs, where L is a positive integer and L≤6. Optionally, L may be a parameter configured by a higher layer, and the value of L is 2, 3, or 6.

Optionally, if it is a non-interleaved CCE to REG mapping, L=6, one CCE corresponds to one REG group.

Optionally, if it is an interleaved CCE to REG mapping, and the control resource subset includes 1 symbol in the time domain, L=2 or 6, one CCE corresponds to 3 or 1 REG group.

Optionally, if it is an interleaved CCE to REG mapping, and the control resource subset includes 2 symbols in the time domain, L=2 or 6, one CCE corresponds to 3 or 1 REG group.

Optionally, if it is an interleaved CCE to REG mapping, and the control resource subset includes 3 symbols in the time domain, L=3 or 6, one CCE corresponds to 2 or 1 REG group.

Optionally, for an interleaved CCE to REG mapping, the unit of interleaving is the REG group.

The mapping relationship between CCEs and REG groups and the process of mapping a PDCCH to CCEs will be described in detail below in conjunction with specific embodiments.

Figure 4:
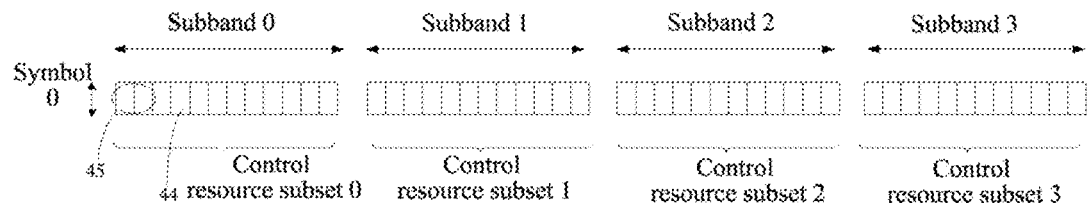
FIG. 4 is a schematic diagram of still another control resource according to the present application.

Taking K=4, N=4, and R=2 as an example, as shown in FIG. 4, the first control resource set includes 4 control resource subsets, for example, control resource subsets 0-3. Each control resource subset includes 12 physical resource blocks (PRBs) in the frequency domain, and 1 symbol in the time domain, for example, one orthogonal frequency division multiplexing (OFDM) symbol. Each small grid in FIG. 4 represents a resource element group (REG), for example, 44 identifies any REG. Assuming that two REGs form a REG group, as shown in FIG. 4, 45 represents any REG group. Optionally, one CCE includes 6 REGs, then one CCE includes 3 REG groups, each control resource subset includes 2 CCEs, and 2 CCEs include 6 REG groups. That is, the first control resource set includes 8 CCEs.

In a possible manner, the serial number of the first transmission unit included in the k-th control resource subset is k*R+r, the value of k is 0 to K−1, and the value of r is 0 to R−1. Taking K=4, N=4, and R=2 as an example, as shown in FIG. 4, the serial numbers of the CCEs included in the control resource subset 0 are 0 and 1, and the serial numbers of the CCEs included in the control resource subset 1 are 2, 3; the serial numbers of the CCEs included in the control resource subset 2 are 4 and 5; the serial numbers of the CCEs included in the control resource subset 3 are 6, 7. That is to say, the control resource subset 0 includes CCE0 and CCE1, the control resource subset 1 includes CCE2 and CCE3, the control resource subset 2 includes CCE4 and CCE5, and the control resource subset 3 includes CCE6 and CCE7, that is, the CCEs are mapped sequentially on the subbands.

Further, on the basis of FIG. 4, the REG groups in each control resource subset are numbered.

Figure 5:
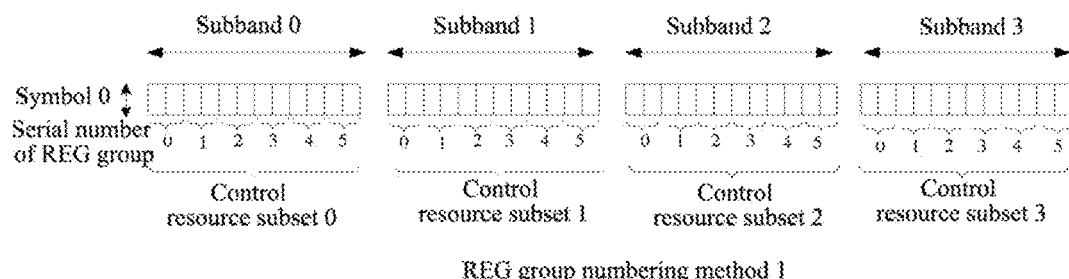
FIG. 5 is a schematic diagram of numbering of REG groups according to the present application.

A possible numbering method is numbering method 1 as shown in FIG. 5. For example, each control resource subset includes 6 REG groups, and in each control resource subset, the serial numbers of the 6 REG groups are 0-5.

Another possible numbering method is numbering method 2 as shown in FIG. 5, that is, the REG groups in the 4 control resource subsets are numbered sequentially, the serial numbers of the 6 REG groups in the control resource subset 0 are 0-5, and the serial numbers of the 6 REG groups in the control resource subset 1 are 6-11, the serial numbers of the 6 REG groups in the control resource subset 2 are 12-17, and the serial numbers of the 6 REG groups in the control resource subset 3 are 18-23.

It is understandable that, in the present application, the numbering of CCEs or REGs is to facilitate the description of the scheme, but does not limit the indexes of CCEs or REGs. Specifically, the serial number of CCE or REG may be an index of CCE or REG, or may not be an index of CCE or REG. For example, control resource subsets 0-3 respectively include 6 REGs, the serial numbers of the REGs in each control resource subset are 0-5, but the indexes of the REGs in the control resource subset 0 are 0-5, the indexes of the REGs in the control resource subset 1 are 6-11, the indexes of the REGs in the control resource subset 2 are 12-17, and the indexes of the REGs in the control resource subset 3 are 18-23.

In a case of numbering REG groups according to the numbering method 1, the numbering of REG groups included in the CCEs in each control resource subset can be performed in the following possible manners:

In a possible manner, since each control resource subset includes 2 CCEs, here, the serial numbers of the 2 CCEs included in each control resource subset can be set to 0 and 1, for example, the serial numbers of the 2 CCEs included in the control resource subset 0 are 0 and 1, the serial numbers of the 2 CCEs included in the control resource subset 1 are 0 and 1, and the serial numbers of the 2 CCEs included in the control resource subset 2 are 0 and 1, and the serial numbers of the 2 CCEs included in the control resource subset 3 are 0 and 1. The serial numbers of the REG groups included in CCE0 in the control resource subset 0 are 0, 1, and 2, and the serial numbers of the REG groups included in CCE1 in the control resource subset 0 are 3, 4, and 5, and here, all the REG groups numbered 0-5 are REG groups in the control resource subset 0. The serial numbers of the REG groups included in CCE0 in the control resource subset 1 are 0, 1, and 2, and the serial numbers of the REG groups included in CCE1 in the control resource subset 1 are 3, 4, and 5, and here, all the REG groups numbered 0-5 are REG groups in the control resource subset 1. The serial numbers of the REG groups included in CCE0 in the control resource subset 2 are 0, 1, and 2, and the serial numbers of the REG groups included in CCE1 in the control resource subset 2 are 3, 4, and 5, and here, all the REG groups numbered 0-5 are REG groups in the control resource subset 2. The serial numbers of the REG groups included in CCE0 in the control resource subset 3 are 0, 1, and 2, and the serial numbers of the REG groups included in CCE1 in the control resource subset 3 are 3, 4, and 5, and here all the REG groups numbered 0-5 are REG groups in the control resource subset 3.

In another possible manner, the serial numbers of the REG groups included in the CCE0 in the control resource subset 0 are 0, 2, and 4, and the serial numbers of the REG groups included in the CCE1 in the control resource subset 0 are 1, 3, and 5, and here, all the REG groups numbered 0-5 are REG groups in the control resource subset 0. The serial numbers of the REG groups included in the CCE0 in the control resource subset 1 are 0, 2, and 4, and the serial numbers of the REG groups included in the CCE1 in the control resource subset 1 are 1, 3, and 5, and here, all the REG groups numbered 0-5 are REG groups in the control resource subset 1. The serial numbers of the REG groups included in the CCE0 in the control resource subset 2 are 0, 2, and 4, and the serial numbers of the REG groups included in the CCE1 in the control resource subset 2 are 1, 3, and 5, and here, all the REG groups numbered 0-5 are REG groups in the control resource subset 2. The serial numbers of the REG groups included in the CCE0 in the control resource subset 3 are 0, 2, and 4, and the serial numbers of the REG groups included in the CCE1 in the control resource subset 3 are 1, 3, and 5, and here, all the REG groups numbered 0-5 are REG groups in the control resource subset 3.

In a case of numbering REG groups according to the numbering method 2, the numbering of REG groups included in the CCEs in each control resource subset is performed in the following possible manners:

In a possible manner, the serial numbers of the REG groups included in CCE0 are 0, 1, and 2, the serial numbers of the REG groups included in CCE1 are 3, 4, and 5, and the serial numbers of the REG groups included in CCE2 are 6, 7, and 8, and the serial numbers of the REG groups included in CCE3 are 9, 10 and 11, the serial numbers of the REG groups included in CCE4 are 12, 13, and 14, the serial numbers of the REG groups included in CCE5 are 15, 16, 17, and the serial numbers of the REG groups included in CCE6 are 18, 19, 20, the serial numbers of the REG groups included in CCE7 are 21, 22, and 23. That is, the CCEs in each control resource subset are mapped sequentially. For example, CCE0 and CCE1 in the control resource subset 0 are mapped sequentially, which is the same for other control resource subsets and will not be repeated here.

Figure 6:
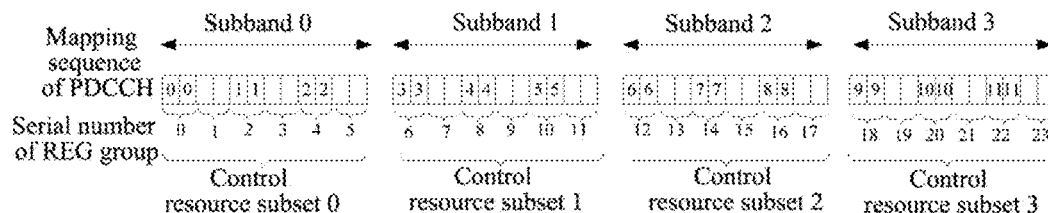
FIG. 6 is a schematic diagram of a mapping of PDCCH to CCEs according to the present application.

In another possible manner, the serial numbers of the REG groups included in CCE0 are 0, 2, and 4, the serial numbers of the REG groups included in CCE1 are 1, 3, and 5, and the serial numbers of the REG groups included in CCE2 are 6, 8, and 10, the serial numbers of the REG groups included in CCE3 are 7, 9, 11, the serial numbers of the REG groups included in CCE4 are 12, 14, and 16, the serial numbers of the REG groups included in CCE5 are 13, 15, and 17, and the serial numbers of the REG groups included in CCE6 are 18, 20, 22, the serial numbers of the REG groups included in CCE7 are 19, 21, and 23. That is, the CCEs in each control resource subset are interleaved and mapped. For example, CCE0 and CCE1 in the control resource subset 0 are interleaved and mapped, which is the same for other control resource subsets and will not be repeated here. Taking this method as an example, it is assumed that a PDCCH is mapped to 4 CCEs, for example, the PDCCH is mapped to the first CCE of each control resource subset, then the serial numbers of the CCEs occupied by the PDCCH are 0, 2, 4, and 6, and the mapping sequence of the PDCCH is as shown in FIG. 6. That is to say, when mapping the PDCCH to CCEs, CCE0 in the control resource subset 0 is first occupied, then CCE2 in the control resource subset 1 is occupied, and next, CCE4 in the control resource subset 2 is occupied, and finally CCE6 in the control resource subset 3 is occupied.

Optionally, for each control resource subset, the number of PRBs included in the frequency domain and/or the number of symbols included in the time domain, is configured by the network device.

Figure 7:
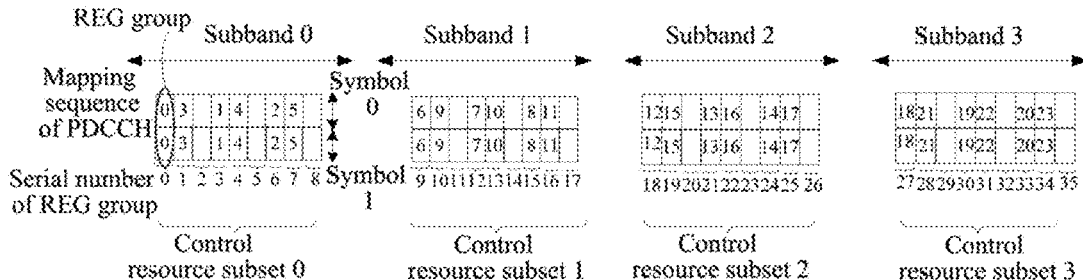
FIG. 7 is a schematic diagram of another mapping of PDCCH to CCEs according to the present application.

In another case, each control resource subset includes 9 PRBs in the frequency domain and 2 symbols in the time domain. As shown in FIG. 7, two consecutive REGs in the time domain form a REG group. Optionally, one CCE includes 6 REGs, then one CCE includes 3 REG groups, each control resource subset includes 3 CCEs, each control resource subset includes 9 REG groups, and the first control resource set includes 12 CCEs.

In a possible manner, the serial numbers of the CCEs included in the control resource subset 0 are 0, 1, and 2; the serial numbers of the CCEs included in the control resource subset 1 are 3, 4, and 5; the serial numbers of the CCEs included in the control resource subset 2 are 6, 7, and 8; the serial numbers of the CCEs included in the control resource subset 3 are 9, 10, and 11. As shown in FIG. 7, the REG groups in each control resource subset are numbered. Optionally, the serial numbers of the REG groups included in CCE0 are 0, 3, and 6, the serial numbers of the REG groups included in CCE1 are 1, 4, and 7, the serial numbers of REG groups included in CCE2 are 2, 5, and 8, and the serial numbers of the REG groups included in CCE3 are 9, 12, and 15, the serial numbers of the REG groups included in CCE4 are 10, 13, and 16, the serial numbers of the REG groups included in CCE5 are 11, 14, and 17, and the serial numbers of the REG groups included in CCE6 are 18, 21, and 24, the serial numbers of the REG groups included in CCE7 are 19, 22, and 25, the serial numbers of the REG groups included in CCE8 are 20, 23, and 26, the serial numbers of the REG groups included in CCE9 are 27, 30, and 33, and the serial numbers of the REG groups included in CCE10 are 28, 31, and 34, and the serial numbers of the REG groups included in CCE11 are 29, 32, and 35. It is assumed that a PDCCH is mapped to 8 CCEs, for example, the PDCCH is mapped to the first two CCEs of each control resource subset, then the serial numbers of the CCEs occupied by the PDCCH are 0, 1, 3, 4, 6, 7, 9, 10. Optionally, the mapping sequence of the PDCCH is as shown in FIG. 7, that is, CCE0 and CCE1 in the control resource subset 0 are first occupied, then CCE3 and CCE4 in the control resource subset 1 are occupied, and next, CCE6 and CCE7 in the control resource subset 2 are occupied, and finally, CCE9 and CCE10 in the control resource subset 3 are occupied, where, in each control resource subset, the serial numbers of CCEs used to carry the PDCCH are consecutive.

Figure 8:
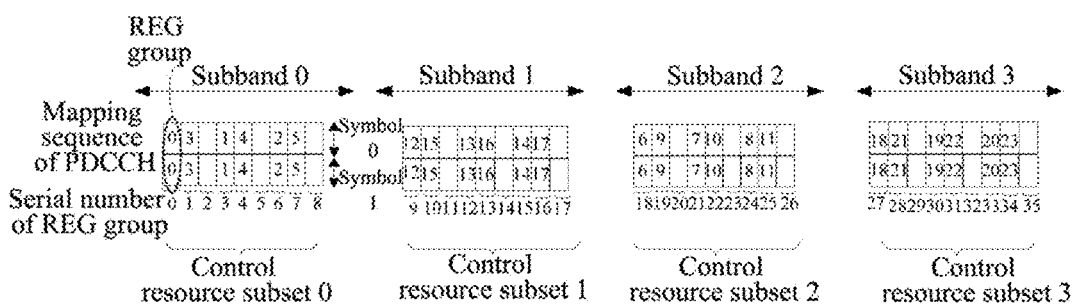
FIG. 8 is a schematic diagram of still another mapping of PDCCH to CCEs according to the present application.

In another possible manner, the serial numbers of the CCEs included in the control resource subset 0 are 0, 1, and 2; the serial numbers of the CCEs included in the control resource subset 2 are 3, 4, and 5; the serial numbers of the CCEs included in the control resource subset 1 are 6, 7, and 8; the serial numbers of the CCEs included in the control resource subset 3 are 9, 10, and 11. As shown in FIG. 8, the REG groups in each control resource subset are numbered. Optionally, the serial numbers of the REG groups included in CCE0 are 0, 3, and 6, the serial numbers of the REG groups included in CCE1 are 1, 4, and 7, the serial numbers of the REG groups included in CCE2 are 2, 5, and 8, the serial numbers of the REG groups included in CCE3 are 18, 21 and 24, the serial numbers of the REG groups included in CCE4 are 19, 22, and 25, the serial numbers of the REG groups included in CCE5 are 20, 23, and 26, the serial numbers of the REG groups included in CCE6 are 9, 12 and 15, the serial numbers of the REG groups included in CCE7 are 10, 13 and 16, the serial numbers of the REG groups included in CCE8 are 11, 14 and 17, and the serial numbers of the REG groups included in CCE9 are 27, 30 and 33, the serial numbers of the REG groups included in CCE10 are 28, 31 and 34, and the serial numbers of the REG groups included in CCE11 are 29, 32 and 35. It is assumed that a PDCCH is mapped to 8 CCEs, for example, the PDCCH is mapped to the first two CCEs of each control resource subset, then the serial numbers of the CCEs occupied by the PDCCH are 0, 1, 3, 4, 6, 7, 9, 10, and optionally, the mapping sequence of the PDCCH is as shown in FIG. 8, where, in each control resource subset, the serial numbers of the CCEs used to carry the PDCCH are consecutive.

Figure 9:
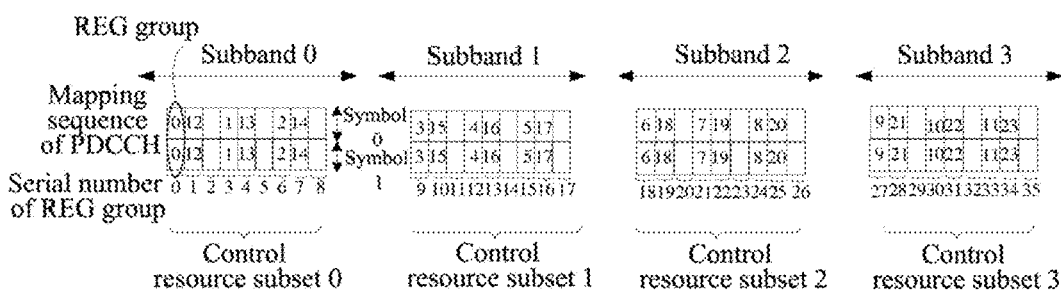
FIG. 9 is a schematic diagram of still another mapping of PDCCH to CCEs according to the present application.

In another possible manner, the serial number of the first transmission unit included in the k-th control resource subset is k+r*K, the value of k is 0 to K−1, and the value of r is 0 to R−1. Taking K=4, N=4, and R=3 as an example, the serial numbers of the CCEs included in the control resource subset 0 are 0, 4, and 8; the serial numbers of the CCEs included in the control resource subset 1 are 1, 5, and 9; the serial numbers of the CCEs included in the control resource subset 2 are 2, 6, and 10; the serial numbers of the CCEs included in the control resource subset 3 are 3, 7, and 11, that is, the CCEs are interleaved and mapped on the subbands. As shown in FIG. 9, the REG groups in each control resource subset are numbered. Optionally, the serial numbers of the REG groups included in CCE0 are 0, 3 and 6, the serial numbers of the REG groups included in CCE1 are 9, 12 and 15, the serial numbers of the REG groups included in CCE2 are 18, 21 and 24, the serial numbers of the REG groups included in CCE3 are 27, 30 and 33, the serial numbers of the REG groups included in CCE4 are 1, 4 and 7, the serial numbers of the REG groups included in CCE5 are 10, 13 and 16, and the serial numbers of the REG groups included in CCE6 are 19, 22 and 25, the serial numbers of the REG groups included in CCE7 are 28, 31 and 34, the serial numbers of the REG groups included in CCE8 are 2, 5 and 8, the serial numbers of REG groups included in CCE9 are 11, 14 and 17, and the serial numbers of the REG groups included in CCE10 are 20, 23 and 26, and the serial numbers of the REG groups included in CCE11 are 29, 32 and 35. It is assumed that a PDCCH is mapped to 8 CCEs, for example, the PDCCH is mapped to the first two CCEs of each control resource subset, then the serial numbers of the CCEs occupied by the PDCCH are 0, 1, 2, 3, 4, 5, 6, 7, and optionally, the mapping sequence of the PDCCH is as shown in FIG. 9. That is, when the PDCCH is mapped to CCEs, the first CCE in each control resource subset is occupied first, and then the second CCE in each control resource subset is occupied. Optionally, the mapping sequence of the PDCCH may also be another sequence, for example, the sequence of the serial numbers of the CCEs occupied by the PDCCH is 0, 4, 1, 5, 2, 6, 3, 7, or, for example, the sequence of the serial numbers of the REG groups included in the CCEs occupied by the PDCCH is 0, 1, 3, 4, 6, 7, 9, 10, 12, 13, 15, 16, 18, 19, 21, 22, 24, 25, 27, 28, 30, 31, 33, 34.

Figure 10:
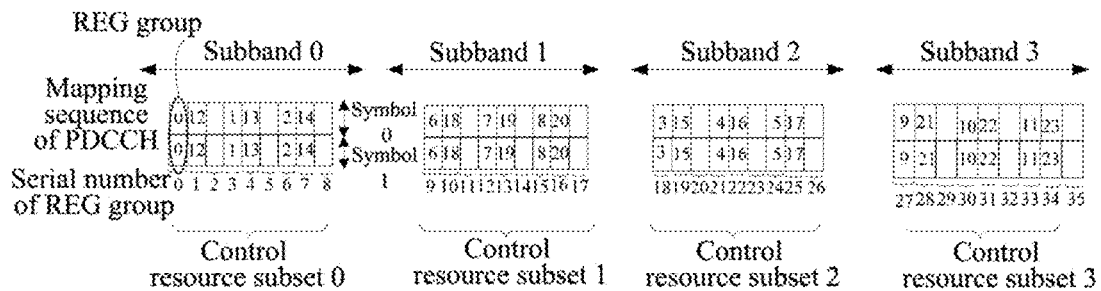
FIG. 10 is a schematic diagram of still another mapping of PDCCH to CCEs according to the present application.

In another possible manner, the serial numbers of the CCEs included in the control resource subset 0 are 0, 4 and 8; the serial numbers of the CCEs included in the control resource subset 2 are 1, 5 and 9; and the serial numbers of the CCEs included in the control resource subset 1 are 2, 6 and 10; the serial numbers of the CCEs included in the control resource subset 3 are 3, 7 and 11. As shown in FIG. 10, the REG groups in each control resource subset are numbered. Optionally, the serial numbers of the REG groups included in CCE0 are 0, 3 and 6, the serial numbers of the REG groups included in CCE1 are 18, 21 and 24, the serial numbers of the REG groups included in CCE2 are 9, 12 and 15, and the serial numbers of the REG groups included in CCE3 are 27, 30 and 33, the serial numbers of the REG groups included in CCE4 are 1, 4 and 7, the serial numbers of the REG groups included in CCE5 are 19, 22 and 25, the serial numbers of the REG groups included in CCE6 are 10, 13 and 16, the serial numbers of the REG groups included in CCE7 are 28, 31 and 34, the serial numbers of the REG groups included in CCE8 are 2, 5 and 8, and the serial numbers of the REG groups included in CCE9 are 20, 23 and 26, the serial numbers of the REG groups included in CCE10 are 11, 14 and 17, and the serial numbers of the REG groups included in CCE11 are 29, 32 and 35. It is assumed that a PDCCH is mapped to 8 CCEs, for example, the PDCCH is mapped to the first two CCEs of each control resource subset, then the serial numbers of the CCEs occupied by the PDCCH are 0, 1, 2, 3, 4, 5, 6, 7. Optionally, the mapping sequence of the PDCCH is as shown in FIG. 10. Optionally, the mapping sequence of the PDCCH may also be another sequence. For example, the sequence of the serial numbers of the CCEs occupied by the PDCCH is 0, 4, 1, 5, 2, 6, 3, 7, or, for example, the sequence of the serial numbers of the REG groups included in the CCEs occupied by the PDCCH is 0, 1, 3, 4, 6, 7, 18, 19, 21, 22, 24, 25, 9, 10, 12, 13, 15, 16, 27, 28, 30, 31, 33, 34.

Figure 11:
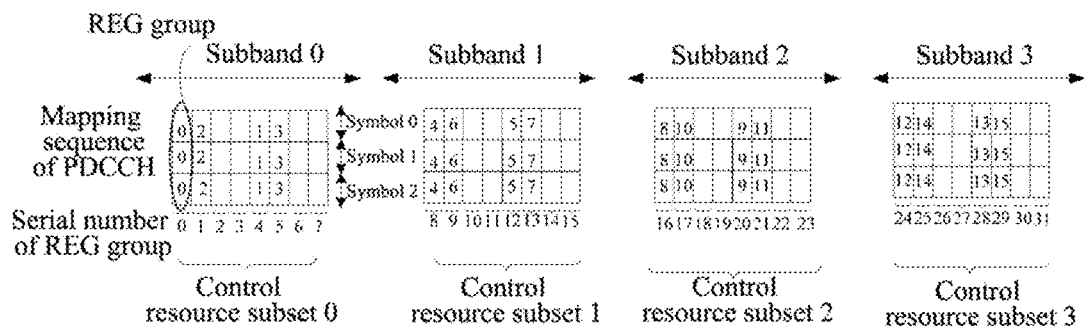
FIG. 11 is a schematic diagram of still another mapping of PDCCH to CCEs according to the present application.

In another case, each control resource subset includes 8 PRBs in the frequency domain and 3 symbols in the time domain. As shown in FIG. 11, three REGs which are consecutive in the time domain form a REG group. Optionally, one CCE includes 6 REGs, then one CCE includes 2 REG groups, each control resource subset includes 4 CCEs, each control resource subset includes 8 REG groups, and the first control resource set includes 16 CCEs. Optionally, the serial numbers of the CCEs included in the control resource subset 0 are 0, 1, 2, and 3; the serial numbers of the CCEs included in the control resource subset 1 are 4, 5, 6, and 7; the serial numbers of the CCEs included in the control resource subset 2 are 8, 9, 10, and 11; the serial numbers of the CCEs included in the control resource subset 3 are 12, 13, 14, and 15. As shown in FIG. 11, the REG groups in each control resource subset are numbered. In a possible manner, the serial numbers of the REG groups included in CCE0 are 0 and 4, the serial numbers of the REG groups included in CCE1 are 1 and 5, the serial numbers of the REG groups included in CCE2 are 2 and 6, the serial numbers of the REG groups included in CCE3 are 3 and 7, the serial numbers of the REG groups included in CCE4 are 8 and 12, the serial numbers of the REG groups included in CCE5 are 9 and 13, the serial numbers of the REG groups included in CCE6 are 10 and 14, the serial numbers of the REG groups included in CCE7 are 11 and 15, the serial numbers of the REG groups included in CCE8 are 16 and 20, the serial numbers of the REG groups included in CCE9 are 17 and 21, the serial numbers of the REG groups included in CCE10 are 18 and 22, the serial numbers of the REG groups included in CCE11 are 19 and 23, the serial numbers of the REG groups included in CCE12 are 24 and 28, the serial numbers of the REG groups included in CCE13 are 25 and 29, the serial numbers of the REG groups included in CCE14 are 26 and 30, the serial numbers of the REG groups included in CCE15 are 27 and 31. It is assumed that a PDCCH is mapped to 8 CCEs, for example, the PDCCH is mapped to the first two CCEs of each control resource subset, then the serial numbers of the CCEs occupied by the PDCCH are 0, 1, 4, 5, 8, 9, 12 and 13, and the mapping sequence of the PDCCH is as shown in FIG. 11, where, in each control resource subset, the serial numbers of the CCEs used to carry the PDCCH are consecutive.

It is understandable that the mapping relationship in the present application may be a relative mapping relationship, and there may be an offset value in actual situations, which is not limited in the present application.

It is understandable that the above-mentioned mapping relationship between CCEs and REG groups and the process of mapping PDCCH to CCEs are just illustrative description, and are not specifically limited, and other mapping methods are also possible. For the above-mentioned interleaving mapping, a specific interleaving manner is not limited. In addition, the above-mentioned interleaving scheme can also be used for uplink control channel transmission.

The control channel transmission method provided in the embodiment interleaves the CCEs in the control resource subsets on the subbands. Compared with interleaving all resources in CORESET, since the granularity of the control resource subset is smaller than that of CORESET, therefore the effect of interleaving is improved, and when transmission cannot be performed on some subbands due to LBT failure, the gain of interleaving is not affected.

In the foregoing embodiment, each of the multiple subbands included in the BWP is configured with a control resource, and each subband is used to transmit the PDCCH. However, in some cases, a same PDCCH may be transmitted on each subband, causing greater redundancy in the transmission of the PDCCH, resulting in a waste of resources. To solve this problem, an embodiment provides an improved solution. The base station configures a control resource on each of the multiple subbands included in the BWP, but during actual transmission of the PDCCH, the PDCCH is only transmitted in the control resource of one subband, and the control resources of other subbands are used for data transmission, thereby improving the resource utilization rate on the unlicensed spectrum. The solution will be introduced below in conjunction with specific embodiments.

Figure 12:
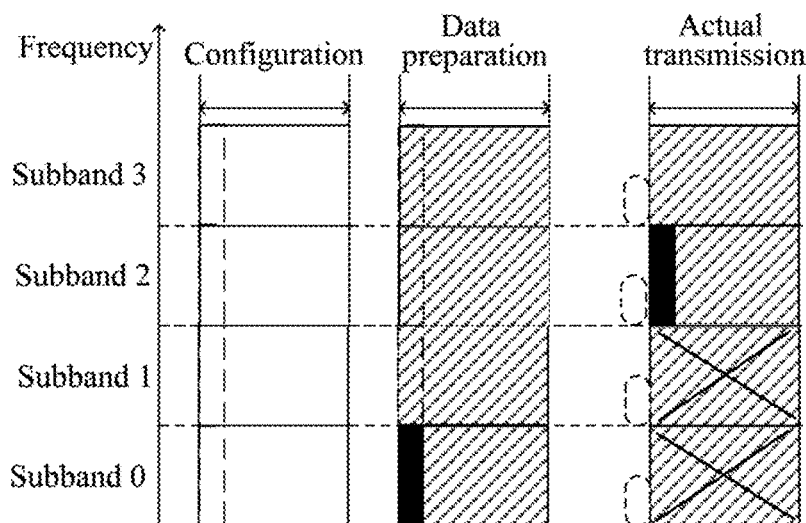
FIG. 12 is a schematic diagram of a mapping of PDCCH to subbands according to the present application.

As shown in FIG. 12, the BWP configured by the system for the terminal device includes four subbands, namely subbands 0-3. In a configuration stage, the network device configures a control resource with a same resource size on each subband. In a data preparation stage, the network device maps the PDCCH to CCEs corresponding to the control resource on a subband. Before the network device transmits the PDCCH to the terminal device, the network device determines, among the four subbands, a subband where a channel use right is obtained, and the subband where a channel use right is obtained is specifically a subband where the LBT is successful. It is assumed that the channel use right is not obtained on subband 0 and subband 1, and the channel use right is obtained on subband 2 and subband 3. In this case, the network device may select, from subband 2 and subband 3, a subband with the smallest index to transmit the PDCCH, and may also select, from subband 2 and subband 3, a subband with the largest index to transmit the PDCCH. For example, the network device selects subband 2 to transmit the PDCCH. It is assumed that a physical downlink shared channel (PDSCH) is originally mapped on a candidate control resource in subband 2, and in this case, a corresponding part of the PDSCH is punctured.

In the control channel transmission method provided in this embodiment, the PDCCH is transmitted only in the control resource of one subband, and the control resources of the other subbands are used for data transmission, thereby improving the resource utilization rate on the unlicensed spectrum.

Figure 13:
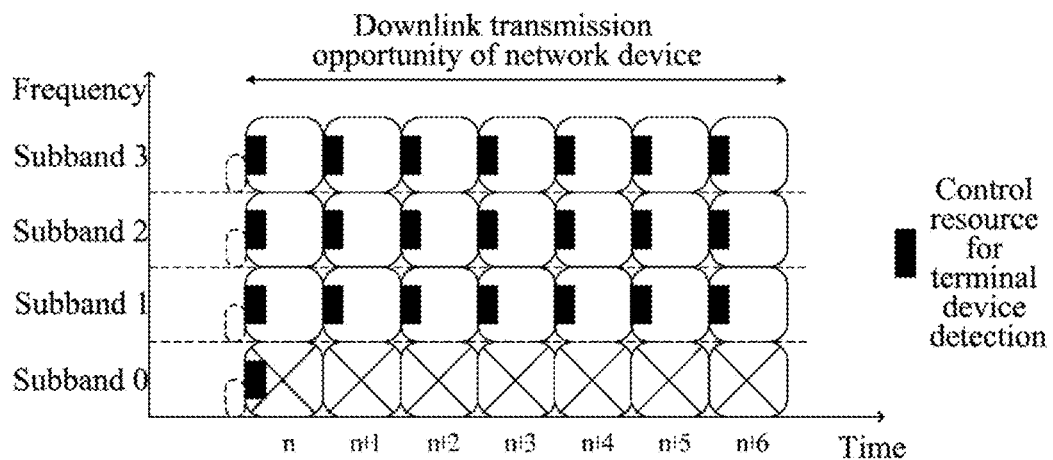
FIG. 13 is a schematic diagram of a downlink transmission opportunity of a network device according to the present application.

For the terminal device, the terminal device may receive the control channel according to the first control resource set, and the control channel may specifically be a PDCCH. The first control resource set here is the same as the first control resource set in the foregoing embodiment, and will not be repeated here. Optionally, the BWP configured by the system for the terminal device includes N subbands, and the first control resource set may be located on K subbands of the N subbands, where N and K are positive integers, and Taking N=4 and K=4 as an example, as shown in FIG. 13, the network device configures a control resource on each of the 4 subbands, The set formed by the control resource on each of the 4 subbands is the first control resource set, that is, the first control resource set is located on the 4 subbands. When transmitting a PDCCH, the network device will select a subband where the channel use right is obtained, to transmit the PDCCH to the terminal device. Before a downlink transmission opportunity of the network device starts, the terminal device receives the control channel according to the first control resource set, that is, the terminal device needs to detect the control resources on the 4 subbands to receive the PDCCH. When the downlink transmission opportunity of the network device starts, the terminal device determines the number of subbands for communication in the four subbands. For example, the channel using right is not obtained on subband 0, and communication is not performed on subband 0, and the channel use right is obtained on subband 1, subband 2 and subband 3, so the number of subbands for communication is 3. It can be understood that this is only a illustrative description, and does not limit the number of subbands where the channel use right is obtained. In this case, the number of subbands for communication determined by the terminal device is less than the number of subbands included in the BWP, that is, at least one of the four subbands is not included in the subbands for communication in the BWP. At this time, the terminal device may receive the PDCCH according to the control resources on the subband 1, the subband 2 and the subband 3, and no longer receive the control channel according to the first control resource set. Here the control resource set on subband 1, subband 2 and subband 3 is denoted as a second control resource set. That is, the control resources included in the second control resource set are fewer than the control resources included in the first control resource set.

As shown in FIG. 13, the downlink transmission opportunity of the network device includes multiple time units, for example, time unit n to time unit n+6. The terminal device determines that the subbands for communication include subband 1, subband 2 and subband 3 in the first time unit of the downlink transmission opportunity, for example, time unit n, and does not include subband 0, then, in subsequent time units (for example, time units n+1, n+2, etc.), the PDCCH is detected on the control resources included in the second control resource set, but the PDCCH is not detected on the control resources included in the first control resource set.

It is understandable that when the terminal device determines the subband for communication in a downlink transmission opportunity of the network device, a certain processing time is required. Therefore, there may be a certain time interval for the terminal device to switch from receiving the PDCCH according to the first control resource set to receiving the PDCCH according to the second control resource set. For example, as shown in FIG. 13, the terminal device starts to receive the PDCCH according to the second control resource set from the time unit n+2. Optionally, the time interval is transmitted by the network device to the terminal device through indication information.

Specifically, the terminal device may determine the subband for communication in a downlink transmission opportunity of the network device in the following possible ways.

In a possible manner, the terminal device receives the PDCCH transmitted by the network device, where the PDCCH is configured to transmit slot format indicator (SFI), and the SFI includes indication information of the subband for communication in the BWP. The terminal device determines the subband for communication in the BWP according to the indication information.

In another possible manner, the terminal device detects a reference signal on each of the multiple subbands included in the BWP to determine the subband for communication in the BWP. For example, if the reference signal is detected by the terminal device on subband 1, the terminal device determines that subband 1 is used for communication. If the reference signal is not detected by the terminal device on subband 0, the terminal device determines that subband 0 is not used for communication.

In another possible manner, the terminal device receives first indication information transmitted by the network device, and the first indication information instructs the terminal device to receive the control channel according to the second control resource set, to enable the terminal device to switch, according to the first indication information, from receiving the PDCCH according to the first control resource set to receiving the PDCCH according to the second control resource set. Optionally, the first indication information is physical layer signaling.

Optionally, the network device may also transmit second indication information to the terminal device. The second indication information is configured to indicate a position of the first control resource set, to enable the terminal device to determine the first control resource set before receiving the PDCCH according to the first control resource set. Optionally, the second indication information is radio resource control (RRC) signaling.

Optionally, the network device may also transmit third indication information to the terminal device. The third indication information is configured to indicate a position of the second control resource set, to enable the terminal device to determine the second control resource set before receiving the PDCCH according to the second control resource set. Optionally, the third indication information is RRC signaling or physical layer signaling.

In the control channel transmission method provided in this embodiment, after the terminal device determines that the K subbands occupied by the control resources during actual transmission is less than the N subbands occupied by the control resources configured by the network device, the terminal device switches to receive the PDCCH according to the actually transmitted K subbands, which can reduce the power consumption of the terminal device.

For the network device, correspondingly, there may be the following implementations.

In an implementation manner, the network device prepares the mapping of a control channel according to the first control resource set, and when the network device determines (for example, determined by the channel detection result) that the subbands for communication in the first BWP do not include at least one subband of the K subbands, the network device still prepares the mapping of the control channel according to the first control resource set, but transmits the control channel according to the second control resource set. In other words, when the network device prepares the mapping of the PDCCH, the mapping sequence of PDCCH to CCEs or REGs will not change according to a difference in actual transmitted subbands (for example, the network device always maps the PDCCH according to the first control resource set or the network device repeatedly transmits the PDCCH on each of the K subbands).

Correspondingly, when the terminal device determines that the P subbands occupied by the control resource during actual transmission is less than the K subbands occupied by the control resource configured by the network device, the method for the terminal device to detect the PDCCH according to the first control resource set is the same as the method for detecting the PDCCH according to the second control resource set. In other words, the mapping sequence of PDCCH to CCEs or REGs determined by the terminal device will not change according to a difference in actual transmitted subbands. The advantage of this solution is that the terminal device will not have any error in the recognition of PDCCH rate matching, and the implementation is simple.

In an implementation manner, the network device prepares the mapping of the control channel according to the first control resource set by default. When the network device determines (for example, determined by the channel detection result) that the subbands for communication in the first BWP does not include at least one of the K subbands and the aforementioned time interval is satisfied, the network device prepares the mapping of the control channel according to the second control resource set, and transmits the control channel according to the second control resource set. In other words, when the network device prepares the mapping of the PDCCH, the mapping sequence of the PDCCH to CCEs or REGs will change according to the difference in actual transmitted subbands.

Correspondingly, the method for the terminal device to detect the PDCCH according to the first control resource set is different from the method for detecting the PDCCH according to the second control resource set. For example, the terminal device detects the PDCCH according to the first control resource set by default. When the terminal device determines that the P subbands occupied by the control resources in actual transmission is less than the K subbands occupied by the control resources configured by the network device and the aforementioned time interval is satisfied, the terminal device detects the PDCCH according to the second control resource set. In other words, the mapping sequence of the PDCCH to CCEs or REGs determined by the terminal device will change according to a difference in actual transmitted subbands. The advantage of this scheme is that redundant transmission is reduced and PDCCH performance is better. But the risk is that if the terminal device does not correctly determine the actual transmitted P subbands, it may have an error in the recognition of PDCCH rate matching, resulting in demodulation failure.

In addition, it should be noted that the uppercase letters and lowercase letters in the embodiments of the present application indicate different meanings, respectively. For example, the uppercase "K" represents the number of control resource subsets included in the first control resource set, the lowercase "k" represents a k-th control resource subset of the K control resource subsets, and the value of k is from 0 to K−1.

Figure 14:
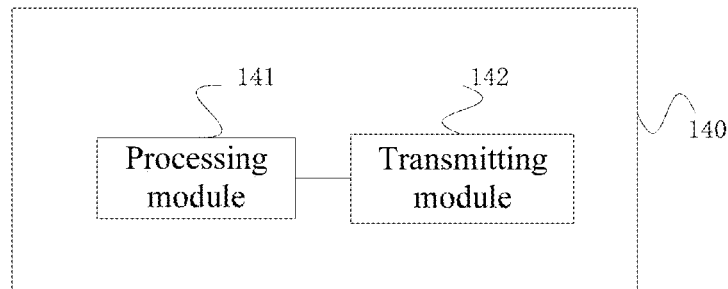
FIG. 14 is a schematic structural diagram of a network device according to the present application.

FIG. 14 is a schematic structural diagram of the network device according to the present application. As shown in FIG. 14, the network device 140 includes:

a processing module 141, configured to map a first control channel to S first transmission units included in a first control resource set, where the first control resource set is a control resource set on a first bandwidth part BWP, the first BWP includes N subbands, the first control resource set is located on at least one subband of the N subbands, and the first transmission unit is a smallest unit configured to transmit a control channel, where S and N are positive integers, S≥1 and N≥2;

a transmitting module 142, configured to transmit the first control channel to a terminal device.

The network device provided in this embodiment is used to implement the technical solution on the network device side in any of the foregoing method embodiments, and its implementation principles and technical effects are similar, and will not be repeated here.

On the basis of the embodiment shown in FIG. 14 above, the first control resource set includes K control resource subsets, each control resource subset of the K control resource subsets includes R first transmission units, each control resource subset of the K control resource subsets is located on one subband of the N subbands, the K control resource subsets are one-to-one corresponding to K subbands of the N subbands, where K and R are positive integers, K≤N and K*R≥S.

Optionally, the first control resource set includes K*R first transmission units, where a serial number of a first transmission unit included in a k-th control resource subset is k*R+r, the value of k is 0 to K−1, and the value of r is 0 to R−1.

Optionally, the first control resource set includes K*R first transmission units, where a serial number of a first transmission unit included in a k-th control resource subset is k+r*K, the value of k is 0 to K−1, and the value of r is 0 to R−1.

Optionally, the first transmission unit includes T resource unit groups, the R first transmission units include R*T resource unit groups, where a serial number of a resource unit group included in an r-th first transmission unit is r*T+t, the value of r is 0 to R−1, and the value of t is 0 to T−1.

Optionally, the first transmission unit includes T resource unit groups, the R first transmission units include R*T resource unit groups, where a serial number of a resource unit group included in an r-th first transmission unit is r+t*R, the value of r is 0 to R−1, and the value of t is 0 to T−1.

Optionally, the serial numbers of at least two transmission units of the S first transmission units are non-consecutive, where S≥2.

Optionally, the first control resource set includes K control resource subsets, where S=K*M, K and M are positive integers, K≤N, M≥1; when the processing module 141 maps the first control channel to the S first transmission units included in the first control resource set, the processing module 141 is specifically configured to: when mapping the first control channel, first occupy M first transmission units with consecutive numbers in a k-th control resource subset of the K control resource subsets, then occupy M first transmission units with consecutive numbers in a (k+1)-th control resource subset of the K control resource subsets, where the value of k is 0 to K−1.

Optionally, the first control resource set includes K control resource subsets, where S=K*M, K and M are positive integers, K≤N, and M≥1; when the processing module 141 maps the first control channel to the S first transmission units included in the first control resource set, the processing module 141 is specifically configured to: when mapping the first control channel, first occupy an m-th first transmission unit in each control resource subset of the K control resource subsets, and then occupy an (m+1)-th first transmission unit in each control resource subset, where the value of m is 0 to M−1.

Optionally, the S first transmission units are located on one subband of the N subbands.

Optionally, the one subband is a subband where a channel use right is obtained.

Optionally, before the transmitting module 142 transmits the first control channel to the terminal device, the processing module 141 is further configured to determine the subband where the channel use right is obtained, among the N subbands; when transmitting the first control channel to the terminal device, the transmitting module 142 is specifically configured to: transmit the first control channel to the terminal device on the subbands where the channel use right is obtained, among the N subbands.

An embodiment of the present application provides a terminal device. The terminal device includes: a receiving module, configured to receive a first control channel transmitted by a network device, the first control channel being mapped to S first transmission units included in a first control resource set, where the first control resource set is a control resource set on a first bandwidth part BWP, the first BWP includes N subbands, the first control resource set is located on at least one subband of the N subbands, the first transmission unit is a smallest unit for transmitting a control channel, where S and N are positive integers, S≥1, and N≥2.

The terminal device provided in the embodiment is used to implement the technical solution on the terminal device side in any of the foregoing method embodiments, and its implementation principles and technical effects are similar, and will not be repeated here.

Further, the first control resource set includes K control resource subsets, each of the K control resource subsets includes R first transmission units, each control resource subset of the K control resource subsets is located on one subband of the N subbands, the K control resource subsets are one-to-one corresponding to K subbands of the N subbands, where K and R are positive integers, K≤N, and K*R≥S.

Optionally, the first control resource set includes K*R first transmission units, where a serial number of a first transmission unit included in a k-th control resource subset is k*R+r, the value of k is 0 to K−1, and the value of r is 0 to R−1.

Optionally, the first control resource set includes K*R first transmission units, where a serial number of a first transmission unit included in a k-th control resource subset is k+r*K, the value of k is 0 to K−1, and the value of r is 0 to R−1.

Optionally, the first transmission unit includes T resource unit groups, the R first transmission units include R*T resource unit groups, and a serial number of a resource unit group included in an r-th first transmission unit is r*T+t, the value of r is 0 to R−1, and the value of t is 0 to T−1.

Optionally, the first transmission unit includes T resource unit groups, the R first transmission units include R*T resource unit groups, and a serial number of a resource unit group included in an r-th first transmission unit is r+t*R, the value of r is 0 to R−1, and the value of t is 0 to T−1.

Optionally, the serial numbers of at least two first transmission units of the S first transmission units are non-consecutive, where S≥2.

Optionally, the S first transmission units are located on one subband of the N subbands.

Optionally, the one subband is a subband where a channel use right is obtained.

Figure 15:
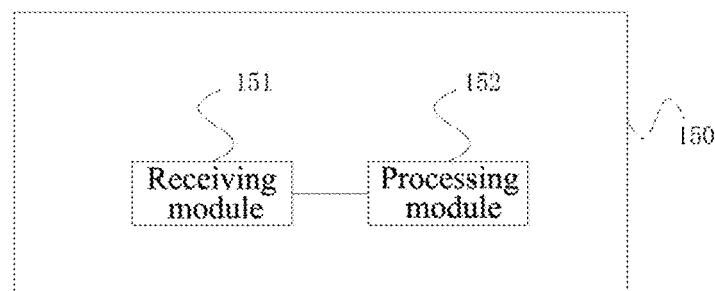
FIG. 15 is another schematic structural diagram of a terminal device according to the present application.

FIG. 15 is another schematic structural diagram of the terminal device according to the present application. As shown in FIG. 15, the terminal device 150 includes:

a receiving module 151, configured to receive a control channel according to a first control resource set, where the first control resource set is a control resource set on a first bandwidth part BWP, the first BWP includes N subbands, the first control resource set is located on K subbands of the N subbands, N and K are positive integers, and N≥K≥2;

a processing module 152, configured to determine that a subband for communication in the first BWP does not include at least one subband of the K subbands;

the receiving module 151 being further configured to: when the processing module 152 determines that the subband for communication in the first BWP does not include at least one subband of the K subbands, receive the control channel according to the second control resource set, the second control resource set being located on P subband of the K subbands, where P is a positive integer, and 1≤P<K.

The terminal device provided in this embodiment is used to implement the technical solution on the terminal device side in any of the foregoing method embodiments, and its implementation principles and technical effects are similar, and will not be repeated here.

Further, the second control resource set includes resources located on the P subbands in the first control resource set.

Optionally, the processing module 152 is specifically configured to: determine the subband for communication in the first BWP according to a first downlink control channel transmitted by a network device; determine, according to the subband for communication, that the subband for communication in the first BWP does not include at least one subband of the K subbands.

Optionally, the first downlink control channel is configured to transmit time slot format information SFI, and the SFI includes indication information of the subband for communication in the first BWP.

Optionally, the processing module 152 is specifically configured to: determine, according to presence detection of a reference signal on each subband of the K subbands, that the subband for communication in the first BWP does not include at least one subband of the K subbands.

Optionally, the receiving module 151 is further configured to: receive first indication information transmitted by a network device, where the first indication information is configured to instruct the terminal device to receive the control channel according to the second control resource set.

Optionally, the receiving module 151 is further configured to: receive second indication information transmitted by the network device; the processing module 152 is further configured to determine the first control resource set according to the second indication information.

Optionally, the receiving module 151 is further configured to: receive third indication information transmitted by the network device; the processing module 152 is further configured to determine the second control resource set according to the third indication information.

Figure 16:
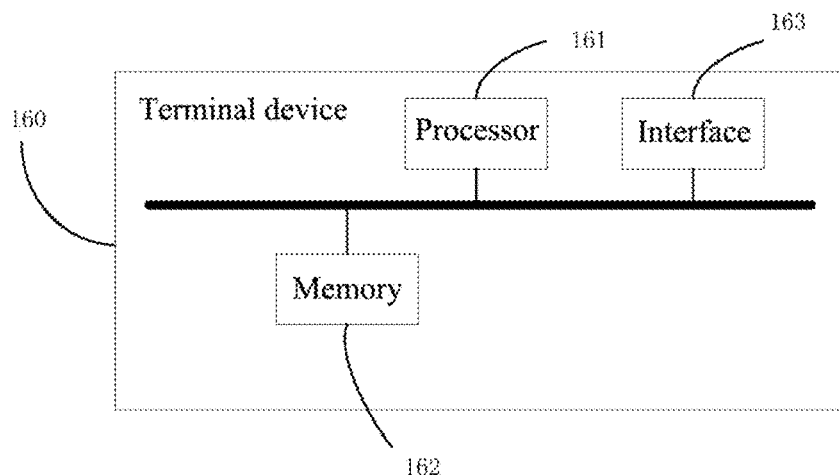
FIG. 16 is another schematic structure diagram of the terminal device according to the present application.

FIG. 16 is another schematic structural diagram of the terminal device according to the present application. As shown in FIG. 16, the terminal device 160 includes:

a processor 161, a memory 162, and an interface 163 for communicating with a network device;

the memory 162 storing computer execution instructions;

the processor 161 executing the computer execution instructions stored in the memory 162, to cause the processor 161 to execute the technical solution on the terminal device side in any of the foregoing method embodiments.

FIG. 16 is a simple design of the terminal device. The embodiment of the present application does not limit the number of processors and memories in the terminal device. FIG. 16 only takes the number of 1 as an example for illustration.

Figure 17:
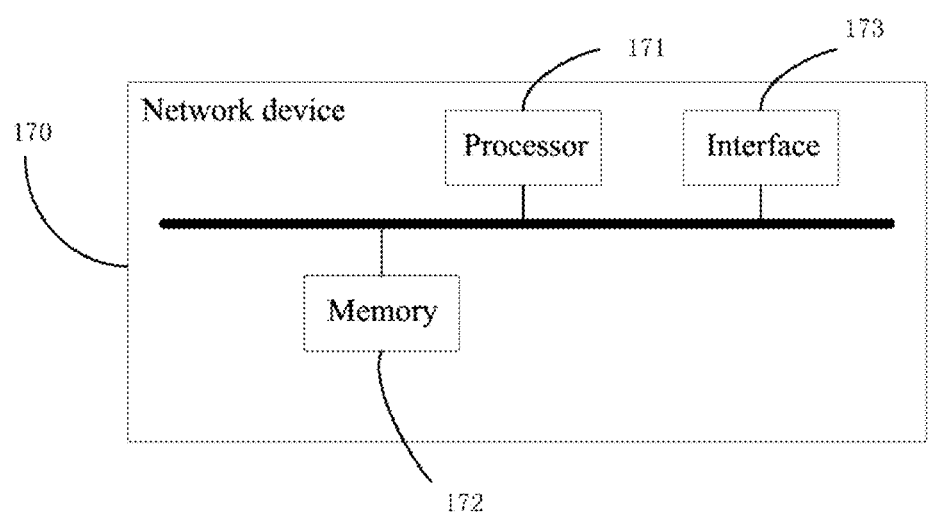
FIG. 17 is another schematic structural diagram of the network device according to the present application.

FIG. 17 is another schematic structural diagram of the network device according to the present application. As shown in FIG. 17, the network device 170 includes:

a processor 171, a memory 172, and an interface 173 for communicating with a terminal device;

the memory 172 storing computer execution instructions;

the processor 171 executing the computer execution instructions stored in the memory 172, to cause the processor 171 to execute the technical solution on the network device side in any of the foregoing method embodiments.

FIG. 17 is a simple design of the network device. The embodiment of the present application does not limit the number of processors and memories in the network device. FIG. 17 only takes the number of 1 as an example for illustration.

In a specific implementation of the terminal device shown in FIG. 16 and the network device described in FIG. 17, the memory, the processor, and the interface may be connected by a bus. Optionally, the memory may be integrated inside the processor.

An embodiment of the present application also provides a computer-readable storage medium. The computer-readable storage medium stores computer execution instructions, and the computer execution instructions, when executed by a processor, are configured to implement the technical solution of the terminal device in any of the foregoing method embodiments.

An embodiment of the present application also provides a computer-readable storage medium, the computer-readable storage medium stores computer execution instructions, and the computer execution instructions, when executed by a processor, are configured to implement the technical solution of the network device in any of the foregoing method embodiments.

The embodiment of the present application also provides a program, and the program when executed by a processor, is configured to execute the technical solution of the terminal device in any of the foregoing method embodiments.

The embodiment of the present application also provides a program, and the program, when executed by the processor, is configured to execute the technical solution of the network device in any of the foregoing method embodiments.

Optionally, the foregoing processor may be a chip.

An embodiment of the present application also provides a computer program product, including program instructions, and the program instructions are configured to implement the technical solution of the terminal device in any of the foregoing method embodiments.

An embodiment of the present application also provides a computer program product, including program instructions, and the program instructions are configured to implement the technical solution of the network device in any of the foregoing method embodiments.

An embodiment of the present application also provides a chip, which includes a processing module and a communication interface, and the processing module can execute the technical solution on the terminal device side in any of the foregoing method embodiments.

Further, the chip also includes a storage module (such as a memory), the storage module is configured to store instructions, the processing module is configured to execute the instructions stored in the storage module, and execution of the instructions stored in the storage module causes the processing module to execute the technical solution on the terminal device side in any of the foregoing method embodiments.

An embodiment of the present application also provides a chip, which includes a processing module and a communication interface, and the processing module can execute the technical solution on the network device side in any of the foregoing method embodiments.

Further, the chip also includes a storage module (such as a memory), the storage module is configured to store instructions, the processing module is configured to execute the instructions stored in the storage module, and the execution of the instructions stored in the storage module causes the processing module to execute the technical solution on the network device side in any of the foregoing method embodiments.

In the several embodiments provided in the present application, it should be understood that the disclosed device and method may be implemented in other ways. For example, the device embodiments described above are only illustrative. For example, the division of the modules is only a logical function division, and there may be other divisions in actual implementation, for example, multiple modules may be combined or integrated into another system, or some features may be omitted or not implemented. In addition, the shown or discussed mutual coupling or direct coupling or communication connection may be through some interfaces. The indirect coupling or communication connection of the modules may be in electrical, mechanical or other forms.

In the specific implementation of the above-mentioned terminal device and network device, it should be understood that the processor may be a central processing unit (CPU), or other general-purpose processors, digital signal processors (DSP), application specific integrated circuit (ASIC), etc. The general-purpose processor may be a microprocessor or the processor may also be any conventional processor or the like. The steps of the method disclosed in the present application may be directly embodied as being executed and completed by a hardware processor, or executed and completed by a combination of hardware and software modules in the processor.

All or part of the steps in the foregoing method embodiments can be implemented by a program instructing relevant hardware. The aforementioned program can be stored in a readable memory. When the program is executed, it executes the steps that include the foregoing method embodiments; and the foregoing memory (storage medium) includes: a read-only memory (ROM), a RAM, a flash memory, a hard disk, a solid state drive, a magnetic tape, a floppy disk, an optical disc and any combination thereof.

What is claimed is:

1. A method of control channel transmission, applied to a terminal device, the method comprising:
   detecting a physical downlink control channel (PDCCH) according to a first control resource set, wherein the first control resource set is a control resource set on a first bandwidth part (BWP), the first BWP comprises N subbands, the first control resource set is located on K subbands of the N subbands, N and K are positive integers and N≥K≥2;
   when determining that subbands corresponding to the first control resource set comprise a subband not for communication, not detecting a PDCCH on the subband not for communication; and/or
   detecting a PDCCH according to a second control resource set, wherein subbands corresponding to the second control resource set comprises P subbands for communication in the K subbands, P is a positive integer and 1≤P<K, and the second control resource set comprises a resource of the first control resource set located on the P subbands.

2. The method according to claim 1, wherein the determining that subbands corresponding to the first control resource set comprise a subband not for communication comprises:
   determining a subband for communication in the first BWP according to a first downlink control channel transmitted by a network device;
   determining that the subbands corresponding to the first control resource set comprise a subband not comprised in the subband for communication in the first BWP.

3. The method according to claim 2, wherein the first downlink control channel is configured for transmitting slot format information, and the slot format information comprises indication information of the subband for communication in the first BWP.

4. The method according to claim 1, wherein the determining that subbands corresponding to the first control resource set comprise a subband not for communication comprises:
   receiving first indication information transmitted by a network device, the first indication information being configured to instruct the terminal device to receive a PDCCH according to the second control resource set.

5. A terminal device, comprising:
   a processor, a memory, and a transceiver, wherein the memory is configured to store a computer program, and the processor is configured to call and run the computer program stored in the memory to:
   detect, through the transceiver, a physical downlink control channel (PDCCH) according to a first control resource set, wherein the first control resource set is a control resource set on a first bandwidth part (BWP), the first BWP comprises N subbands, the first control resource set is located on K subbands of the N subbands, N and K are positive integers and N≥K≥2;
   when determining, through the processor, that subbands corresponding to the first control resource set comprises a subband not for communication, not detect, through the transceiver, a PDCCH on the subband not for communication; and/or
   detect, through the transceiver, a PDCCH according to a second control resource set, wherein subbands corresponding to the second control resource set comprises P subbands for communication in the K subband, P is a positive integer and 1≤P<K, and the second control resource set comprises a resource of the first control resource set located on P subbands.

6. The terminal device according to claim 5, wherein the processor is configured to:
   determine a subband for communication in the first BWP according to a first downlink control channel transmitted by a network device;
   determine that the subbands corresponding to the first control resource set comprise a subband not comprised in the subband for communication in the first BWP.

7. The terminal device according to claim 6, wherein the first downlink control channel is configured for transmitting slot format information, and the slot format information comprises indication information of the subband for communication in the first BWP.

8. The terminal device according to claim 5, wherein the processor is configured to receive, through the transceiver, first indication information transmitted by a network device, the first indication information being configured to instruct the terminal device to receive a PDCCH according to the second control resource set.

* * * * *